US011917205B2

United States Patent
Yea et al.

(10) Patent No.: US 11,917,205 B2
(45) Date of Patent: Feb. 27, 2024

(54) TECHNIQUES AND APPARATUS FOR SCALABLE LIFTING FOR POINT-CLOUD ATTRIBUTE CODING

(71) Applicant: TENCENT AMERICA LLC, Palo Alto, CA (US)

(72) Inventors: Sehoon Yea, Palo Alto, CA (US); Arash Vosoughi, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 143 days.

(21) Appl. No.: 16/919,996

(22) Filed: Jul. 2, 2020

(65) Prior Publication Data

US 2021/0006837 A1 Jan. 7, 2021

Related U.S. Application Data

(60) Provisional application No. 62/871,079, filed on Jul. 5, 2019.

(51) Int. Cl.
*H04N 19/62* (2014.01)
*H04N 19/64* (2014.01)
*H04N 19/96* (2014.01)

(52) U.S. Cl.
CPC ............ *H04N 19/62* (2014.11); *H04N 19/64* (2014.11); *H04N 19/96* (2014.11)

(58) Field of Classification Search
CPC ......... H04N 19/62; H04N 19/96; H04N 19/64
See application file for complete search history.

(56) References Cited

U.S. PATENT DOCUMENTS

| 5,812,788 | A  | * | 9/1998 | Agarwal | H04N 19/172 375/E7.14 |
| 7,644,131 | B2 | * | 1/2010 | Levanon | G06T 3/403 709/217 |
| 2004/0141652 | A1 | * | 7/2004 | Fukuhara | G06T 9/005 382/232 |
| 2006/0080454 | A1 | * | 4/2006 | Li | H04L 67/1019 709/231 |
| 2007/0092102 | A1 | * | 4/2007 | Kot | H04N 1/32229 382/100 |
| 2007/0216545 | A1 | * | 9/2007 | Li | H03M 7/30 341/50 |
| 2009/0232408 | A1 | * | 9/2009 | Meany | H04N 19/647 714/751 |
| 2014/0270564 | A1 | * | 9/2014 | Tao | H04N 19/625 382/254 |
| 2014/0270566 | A1 | * | 9/2014 | Tao | G06T 7/13 382/263 |
| 2015/0085920 | A1 | * | 3/2015 | Rane | H04N 19/61 375/240.03 |
| 2017/0155905 | A1 | * | 6/2017 | Puri | H04N 19/129 |

(Continued)

*Primary Examiner* — Shawn S An
(74) *Attorney, Agent, or Firm* — Sughrue Mion, PLLC

(57) ABSTRACT

A method of encoding video data corresponding to a point cloud by at least one processor, the method including obtaining a plurality of transform coefficients corresponding to attributes of the point cloud; and encoding the plurality of transform coefficients to generate an embedded bitstream, the encoding including iterating over a plurality of bit-planes of the plurality of transform coefficients to process all points in the point cloud.

18 Claims, 9 Drawing Sheets

(56) References Cited

U.S. PATENT DOCUMENTS

| | | | | |
|---|---|---|---|---|
| 2017/0155924 A1* | 6/2017 | Gokhale | ............ | H04N 19/1883 |
| 2018/0288438 A1* | 10/2018 | Chao | ...................... | H04N 19/12 |
| 2019/0081638 A1* | 3/2019 | Mammou | ............ | H04N 19/436 |
| 2020/0302651 A1* | 9/2020 | Flynn | .................... | G06T 3/4084 |

* cited by examiner

TECHNIQUES AND APPARATUS FOR SCALABLE LIFTING FOR POINT-CLOUD ATTRIBUTE CODING

CROSS-REFERENCE TO RELATED APPLICATION

This application claims priority from U.S. Provisional Application No. 62/871,079, filed on Jul. 5, 2019, the disclosure of which is incorporated herein by reference in its entirety.

BACKGROUND

1. Field

Embodiments of the present disclosure are directed to video coding and decoding, video encoders and decoders performing the same, and more specifically, to the coding and decoding of attribute information of point cloud samples.

2. Description of Related Art

Advanced three-dimensional (3D) representations of the world are enabling more immersive forms of interaction and communication, and also allow machines to understand, interpret and navigate our world. 3D point clouds have emerged as an enabling representation of such information. A number of use cases associated with point cloud data have been identified, and corresponding requirements for point cloud representation and compression have been developed.

A point cloud is a set of points in a 3D space, each with associated attributes, e.g. color, material properties, etc. Point clouds can be used to reconstruct an object or a scene as a composition of such points. They can be captured using multiple cameras and depth sensors in various setups, and may be made up of thousands up to billions of points in order to realistically represent reconstructed scenes.

Compression technologies are needed to reduce the amount of data required to represent a point cloud. As such, technologies are needed for lossy compression of point clouds for use in real-time communications and six Degrees of Freedom (6 DoF) virtual reality. In addition, technology is sought for lossless point cloud compression in the context of dynamic mapping for autonomous driving and cultural heritage applications, etc. Moving Pictures Experts Group (MPEG) has started working on a standard to address compression of geometry and attributes such as colors and reflectance, scalable/progressive coding, coding of sequences of point clouds captured over time, and random access to subsets of the point cloud.

FIG. 1A is a diagram illustrating a method of generating levels of detail (LoDs) in G-PCC.

Referring to FIG. 1A, in current Graph-based Point Cloud Compression (G-PCC) attributes coding, an LoD (i.e., a group) of each 3D point (e.g., P0-P9) is generated based on a distance of each 3D point, and then attribute values of 3D points in each LoD is encoded by applying prediction in an LoD-based order 110 instead of an original order 105 of the 3D points. For example, an attributes value of the 3D point P2 is predicted by calculating a distance-based weighted average value of the 3D points P0, P5 and P4 that were encoded or decoded prior to the 3D point P2.

A current anchor method in G-PCC proceeds as follows.

First, a variability of a neighborhood of a 3D point is computed to check how different neighbor values are, and if the variability is lower than a threshold, the calculation of the distance-based weighted average prediction is conducted by predicting attribute values $(a_i)_{i \in 0 \ldots k-1}$, using a linear interpolation process based on distances of nearest neighbors of a current point i. Let $N_i$ be a set of k-nearest neighbors of the current point i, let $(\tilde{a}_j)_{j \in N_i}$ be their decoded/reconstructed attribute values and let $(\delta_j)_{j \in N_i}$ be their distances to the current point i. A predicted attribute value $\hat{a}_i$ is then given by:

$$\hat{a}_i = \text{Round}\left(\frac{1}{k}\sum_{j \in} \aleph_i \frac{\frac{1}{\delta_j^2}}{\sum_{j \in} \aleph_i \frac{1}{\delta_j^2}} \tilde{a}_j\right). \quad \text{(Eq. 1)}$$

Note that geometric locations of all point clouds are already available when attributes are coded. In addition, the neighboring points together with their reconstructed attribute values are available both at an encoder and a decoder as a k-dimensional tree structure that is used to facilitate a nearest neighbor search for each point in an identical manner.

Second, if the variability is higher than the threshold, a rate-distortion optimized (RDO) predictor selection is performed. Multiple predictor candidates or candidate predicted values are created based on a result of a neighbor point search in generating LoD. For example, when the attributes value of the 3D point P2 is encoded by using prediction, a weighted average value of distances from the 3D point P2 to respectively the 3D points P0, P5 and P4 is set to a predictor index equal to 0. Then, a distance from the 3D point P2 to the nearest neighbor point P4 is set to a predictor index equal to 1. Moreover, distances from the 3D point P2 to respectively the next nearest neighbor points P5 and P0 are set to predictor indices equal to 2 and 3, as shown in TABLE 1 below.

TABLE 1

Sample of predictor candidate for attributes coding

| Predictor index | Predicted value |
|---|---|
| 0 | average |
| 1 | P4 ($1^{st}$ nearest point) |
| 2 | P5 ($2^{nd}$ nearest point) |
| 3 | P0 ($3^{rd}$ nearest point) |

After creating predictor candidates, a best predictor is selected by applying a rate-distortion optimization procedure, and then, a selected predictor index is mapped to a truncated unary (TU) code, bins of which will be arithmetically encoded. Note that a shorter TU code will be assigned to a smaller predictor index in TABLE 1.

A maximum number of predictor candidates MaxNumCand is defined and is encoded into an attributes header. In the current implementation, the maximum number of predictor candidates MaxNumCand is set to equal to numberOfNearestNeighborsInPrediction+1 and is used in encoding and decoding predictor indices with a truncated unary binarization.

A lifting transform for attribute coding in G-PCC builds on top of a predicting transform described above. A main difference between the prediction scheme and the lifting scheme is the introduction of an update operator.

FIG. 1B is a diagram of an architecture for Prediction/Update (P/U)-lifting in G-PCC. To facilitate prediction and update steps in lifting, one has to split a signal into two sets of high-correlation at each stage of decomposition. In the lifting scheme in G-PCC, the splitting is performed by leveraging an LoD structure in which such high-correlation is expected among levels and each level is constructed by a nearest neighbor search to organize non-uniform point clouds into a structured data. A P/U decomposition step at a level N results in a detail signal D(N−1) and an approximation signal A(N−1), which is further decomposed into D(N−2) and A(N−2). This step is repeatedly applied until a base layer approximation signal A(1) is obtained.

Consequently, instead of coding an input attribute signal itself that consists of LOD(N), LOD(1), one ends up coding D(N−1), D(N−2), . . . , D(1), A(1) in the lifting scheme. Note that application of efficient P/U steps often leads to sparse sub-bands "coefficients" in D(N−1), . . . , D(1), thereby providing a transform coding gain advantage.

Currently, only a distance-based weighted average prediction described above for the predicting transform is used for a prediction step in the lifting as an anchor method in G-PCC.

SUMMARY

For point cloud data, there are scenarios where scalable reconstruction of data from lossy to lossless or near-lossless fidelity is required. Embodiments of the present disclosure enable the said scalable lossless or near-lossless coding of attributes under the current GPCC lifting design. Embodiments of the present disclosure may extend or modify current G-PCC lifting design to enable scalable coding of lifting coefficients. Embodiments of the present disclosure may be applied to similar codecs designed for point clouds.

Embodiments of the present disclosure relate to point-cloud coding technologies.

In one or more embodiments, a method of encoding video data corresponding to a point cloud by at least one processor is provided. The method includes obtaining a plurality of transform coefficients corresponding to attributes of the point cloud; and encoding the plurality of transform coefficients to generate an embedded bitstream, the encoding including iterating over a plurality of bit-planes of the plurality of transform coefficients to process all points in the point cloud.

In one or more embodiments, an apparatus for encoding video data corresponding to a point cloud. The apparatus includes at least one memory configured to store computer program code; and at least one processor configured to access the at least one memory and operate according to the computer program code. The computer program code including obtaining code configured to cause the at least one processor to obtain a plurality of transform coefficients corresponding to attributes of the point cloud; and encoding code configured to cause the at least one processor to encode the plurality of transform coefficients to generate an embedded bitstream, the encoding code including first iterating code configured to cause the at least one processor to iterate over a plurality of bit-planes of the plurality of transform coefficients to process all points in the point cloud.

In one or more embodiments, a non-transitory computer-readable storage medium storing instructions is provided. The instructions cause at least one processor to obtain a plurality of transform coefficients from video data corresponding to a point cloud, the transform coefficients corresponding to attributes of the point cloud; and encode the plurality of transform coefficients to generate an embedded bitstream by iterating over a plurality of bit-planes of the plurality of transform coefficients to process all points in the point cloud.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Embodiments described herein provide methods and apparatuses for point cloud attribute coding and decoding. The methods and apparatuses may pertain to a current G-PCC lifting design described with respect to FIGS. 1A-B. The methods and apparatuses can be applied to similar codecs designed for point clouds.

Figure 2:
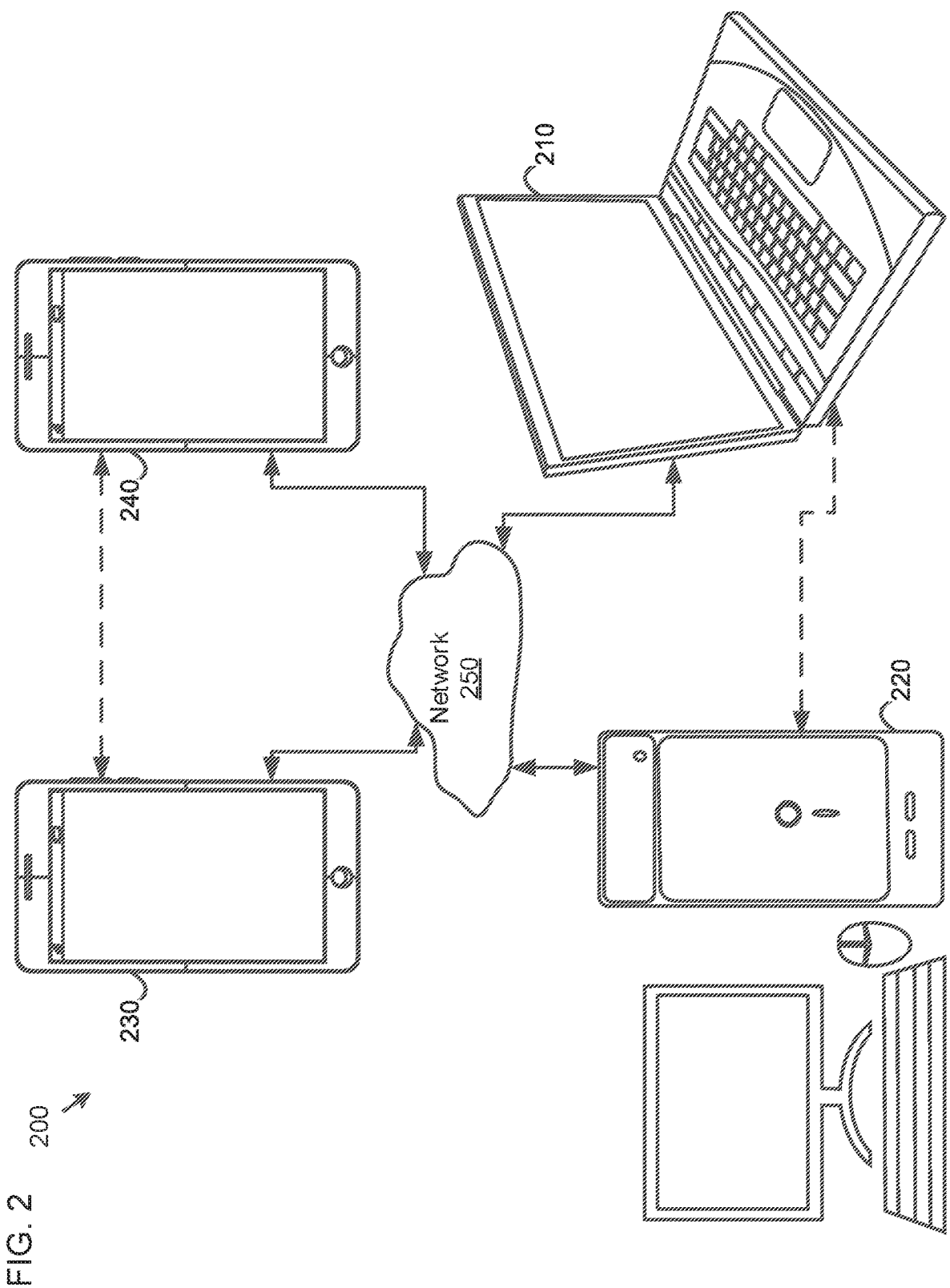
FIG. 2 is a block diagram of a communication system according to embodiments.

FIG. 2 is a block diagram of a communication system 200 according to embodiments. The communication system 200 may include at least two terminals 210 and 220 interconnected via a network 250. For unidirectional transmission of data, a first terminal 210 may code point cloud data at a local location for transmission to a second terminal 220 via the network 250. The second terminal 220 may receive the coded point cloud data of the first terminal 210 from the network 250, decode the coded point cloud data and display the decoded point cloud data. Unidirectional data transmission may be common in media serving applications and the like.

FIG. 2 further illustrates a second pair of terminals 230 and 240 provided to support bidirectional transmission of coded point cloud data that may occur, for example, during videoconferencing. For bidirectional transmission of data, each terminal 230 or 240 may code point cloud data captured at a local location for transmission to the other terminal via the network 250. Each terminal 230 or 240 also may receive the coded point cloud data transmitted by the other terminal, may decode the coded point cloud data and may display the decoded point cloud data at a local display device.

In FIG. 2, the terminals 210-240 may be illustrated as servers, personal computers and smartphones, but principles of the embodiments are not so limited. The embodiments find application with laptop computers, tablet computers, media players and/or dedicated video conferencing equipment. The network 250 represents any number of networks that convey coded point cloud data among the terminals 210-240, including for example wireline and/or wireless communication networks. The communication network 250 may exchange data in circuit-switched and/or packet-switched channels. Representative networks include telecommunications networks, local area networks, wide area networks and/or the Internet. For the purposes of the present discussion, an architecture and topology of the network 250 may be immaterial to an operation of the embodiments unless explained herein below.

Figure 3:
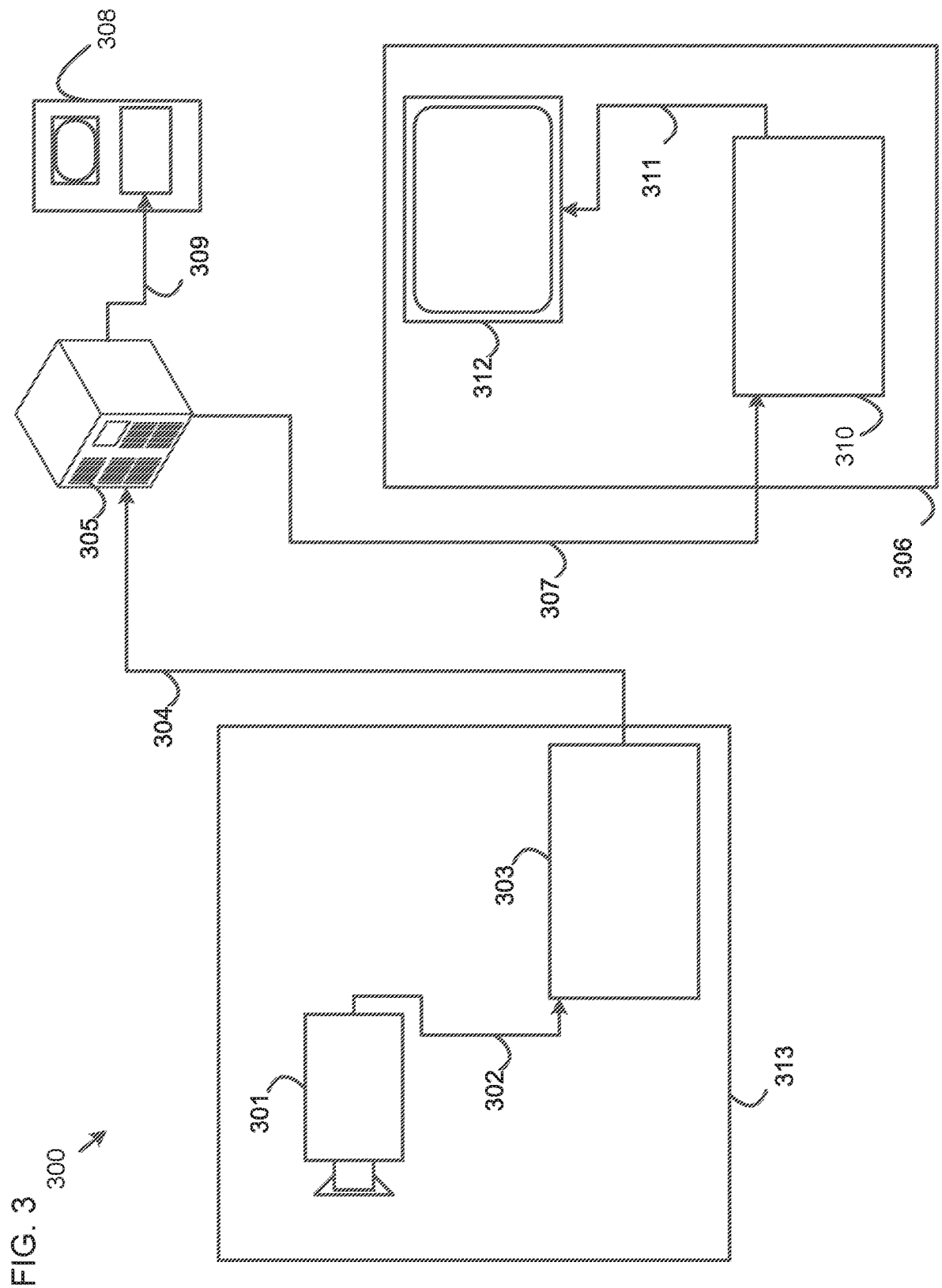
FIG. 3 is a diagram of a placement of a G-PCC compressor and a G-PCC decompressor in an environment, according to embodiments.

FIG. 3 is a diagram of a placement of a G-PCC compressor 303 and a G-PCC decompressor 310 in an environment, according to embodiments. The disclosed subject matter can be equally applicable to other point cloud enabled applications, including, for example, video conferencing, digital TV, storing of compressed point cloud data on digital media including CD, DVD, memory stick and the like, and so on.

A streaming system 300 may include a capture subsystem 313 that can include a point cloud source 301, for example a digital camera, creating, for example, uncompressed point cloud data 302. The point cloud data 302 having a higher data volume can be processed by the G-PCC compressor 303 coupled to the point cloud source 301. The G-PCC compressor 303 can include hardware, software, or a combination thereof to enable or implement aspects of the disclosed subject matter as described in more detail below. Encoded point cloud data 304 having a lower data volume can be stored on a streaming server 305 for future use. One or more streaming clients 306 and 308 can access the streaming server 305 to retrieve copies 307 and 309 of the encoded point cloud data 304. A client 306 can include the G-PCC decompressor 310, which decodes an incoming copy 307 of the encoded point cloud data and creates outgoing point cloud data 311 that can be rendered on a display 312 or other rendering devices (not depicted). In some streaming systems, the encoded point cloud data 304, 307 and 309 can be encoded according to video coding/compression standards. Examples of those standards include those being developed by MPEG for G-PCC.

Figure 4:
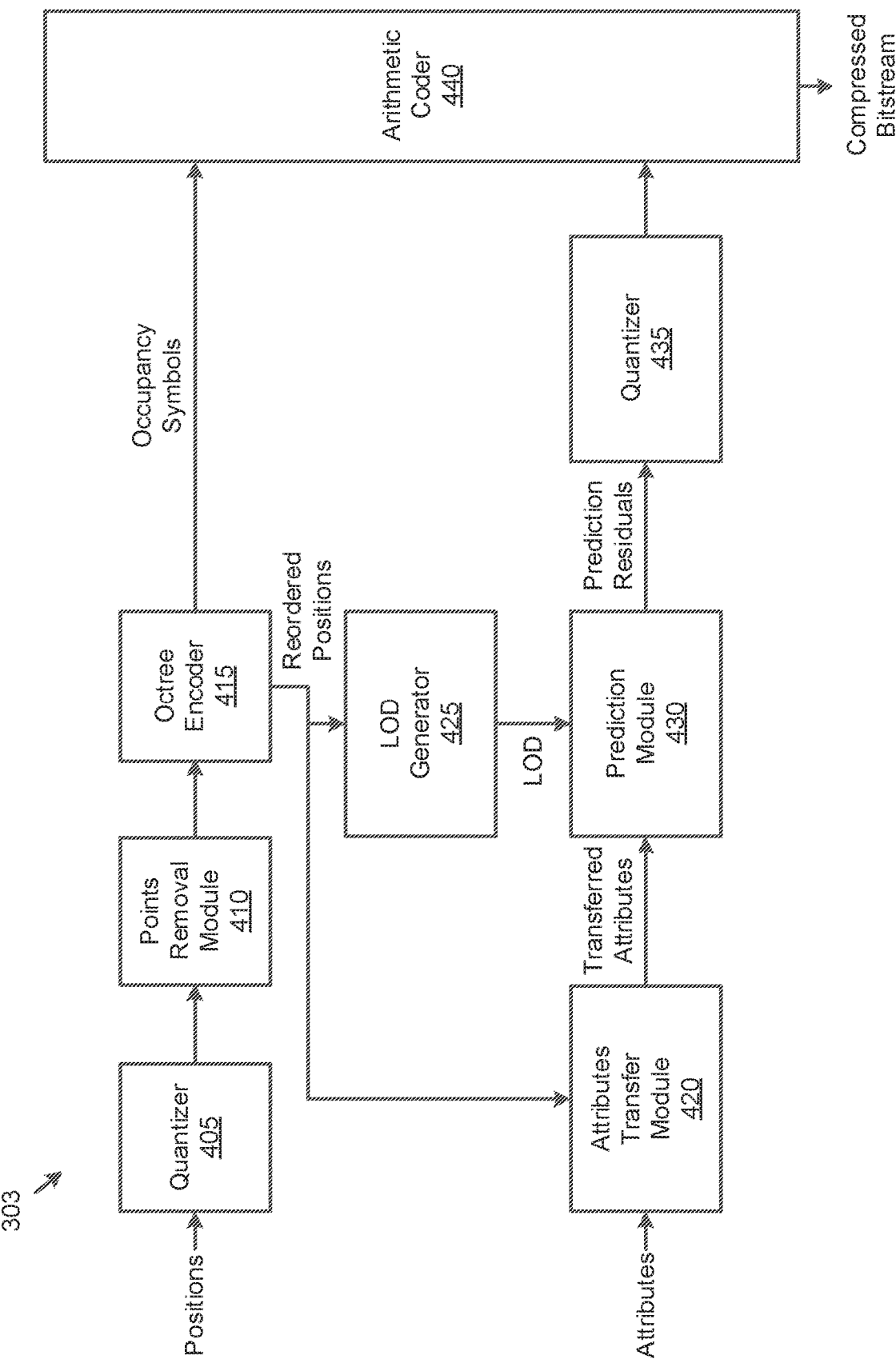
FIG. 4 is a functional block diagram of the G-PCC compressor according to embodiments.

FIG. 4 is a functional block diagram of a G-PCC compressor 303 according to embodiments.

As shown in FIG. 4, the G-PCC compressor 303 includes a quantizer 405, a points removal module 410, an octree encoder 415, an attributes transfer module 420, an LoD generator 425, a prediction module 430, a quantizer 435 and an arithmetic coder 440.

The quantizer 405 receives positions of points in an input point cloud. The positions may be (x,y,z)-coordinates. The quantizer 405 further quantizes the received positions, using, e.g., a scaling algorithm and/or a shifting algorithm.

The points removal module 410 receives the quantized positions from the quantizer 405, and removes or filters duplicate positions from the received quantized positions.

The octree encoder 415 receives the filtered positions from the points removal module 410, and encodes the received filtered positions into occupancy symbols of an octree representing the input point cloud, using an octree encoding algorithm. A bounding box of the input point cloud corresponding to the octree may be any 3D shape, e.g., a cube.

The octree encoder 415 further reorders the received filtered positions, based on the encoding of the filtered positions.

The attributes transfer module 420 receives attributes of points in the input point cloud. The attributes may include, e.g., a color or RGB value and/or a reflectance of each point.

The attributes transfer module 420 further receives the reordered positions from the octree encoder 415.

The attributes transfer module 420 further updates the received attributes, based on the received reordered positions. For example, the attributes transfer module 420 may perform one or more among pre-processing algorithms on the received attributes, the pre-processing algorithms including, for example, weighting and averaging the received attributes and interpolation of additional attributes from the received attributes. The attributes transfer module 420 further transfers the updated attributes to the prediction module 430.

The LoD generator 425 receives the reordered positions from the octree encoder 415, and obtains an LoD of each of the points corresponding to the received reordered positions. Each LoD may be considered to be a group of the points, and may be obtained based on a distance of each of the points. For example, as shown in FIG. 1A, points P0, P5, P4 and P2 may be in an LoD LOD0, points P0, P5, P4, P2, P1, P6 and P3 may be in an LoD LOD1, and points P0, P5, P4, P2, P1, P6, P3, P9, P8 and P7 may be in an LoD LOD2.

The prediction module 430 receives the transferred attributes from the attributes transfer module 420, and receives the obtained LoD of each of the points from the LoD generator 425. The prediction module 430 obtains prediction residuals (values) respectively of the received attributes by applying a prediction algorithm to the received attributes in an order based on the received LoD of each of the points. The prediction algorithm may include any among various prediction algorithms such as, e.g., interpolation, weighted average calculation, a nearest neighbor algorithm and RDO.

Figure 1A:
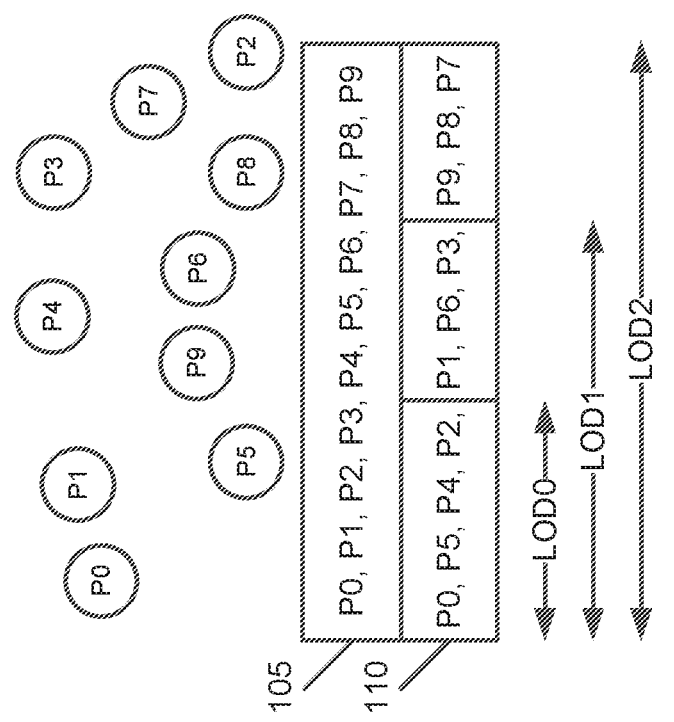
FIG. 1A is a diagram illustrating a method of generating LoD in G-PCC.

For example, as shown in FIG. 1A, the prediction residuals respectively of the received attributes of the points P0, P5, P4 and P2 included in the LoD LOD0 may be obtained first prior to those of the received attributes of the points P1, P6, P3, P9, P8 and P7 included respectively in the LoDs LOD1 and LOD2. The prediction residuals of the received attributes of the point P2 may be obtained by calculating a distance based on a weighted average of the points P0, P5 and P4.

The quantizer 435 receives the obtained prediction residuals from the prediction module 430, and quantizes the received predicted residuals, using, e.g., a scaling algorithm and/or a shifting algorithm.

The arithmetic coder 440 receives the occupancy symbols from the octree encoder 415, and receives the quantized prediction residuals from the quantizer 435. The arithmetic coder 440 performs arithmetic coding on the received occupancy symbols and quantized predictions residuals to obtain a compressed bitstream. The arithmetic coding may include any among various entropy encoding algorithms such as, e.g., context-adaptive binary arithmetic coding.

Figure 5:
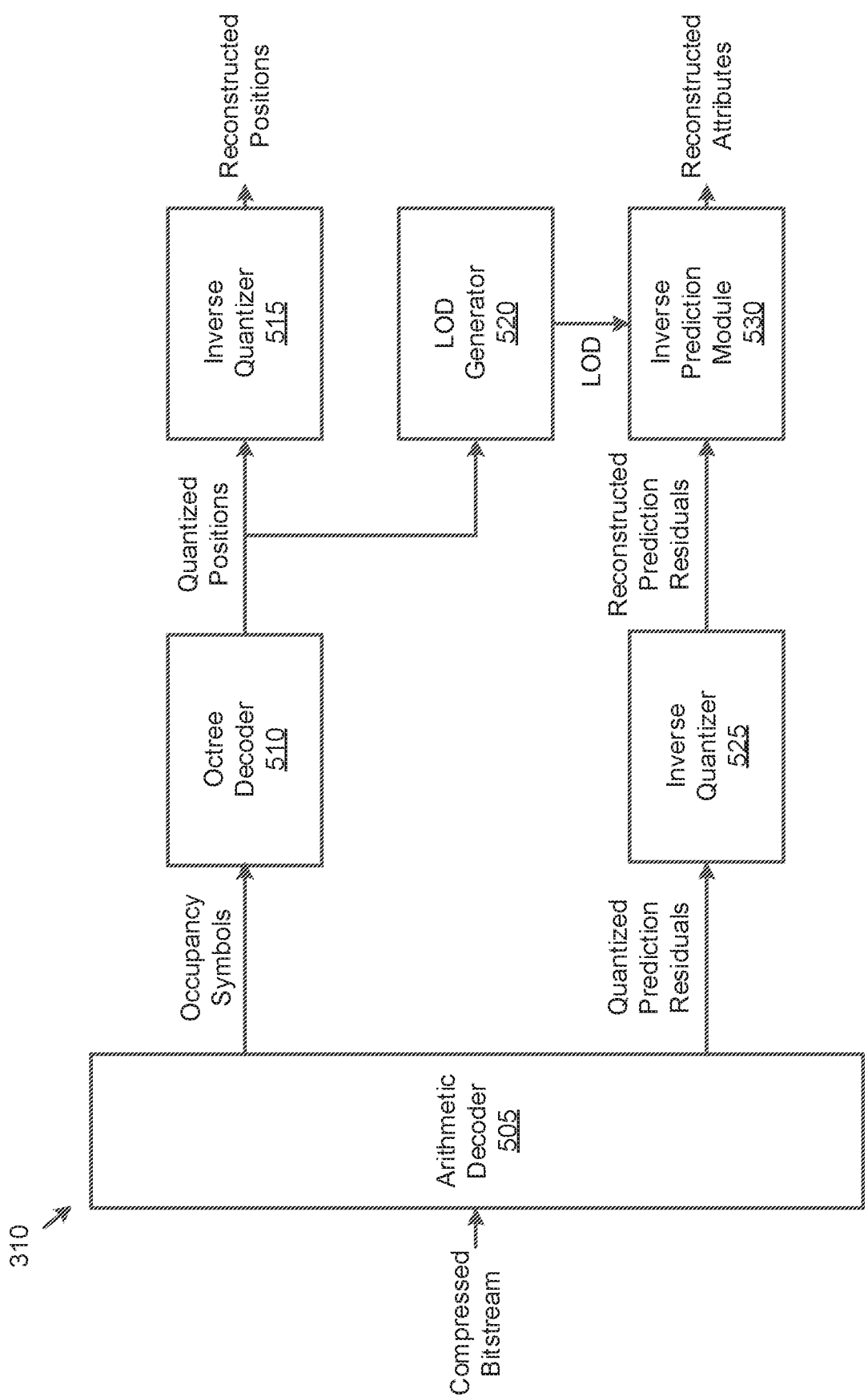
FIG. 5 is a functional block diagram of the G-PCC decompressor according to embodiments.

FIG. 5 is a functional block diagram of a G-PCC decompressor 310 according to embodiments.

As shown in FIG. 5, the G-PCC decompressor 310 includes an arithmetic decoder 505, an octree decoder 510, an inverse quantizer 515, an LoD generator 520, an inverse quantizer 525 and an inverse prediction module 530.

The arithmetic decoder 505 receives the compressed bitstream from the G-PCC compressor 303, and performs arithmetic decoding on the received compressed bitstream to obtain the occupancy symbols and the quantized prediction residuals. The arithmetic decoding may include any among various entropy decoding algorithms such as, e.g., context-adaptive binary arithmetic decoding.

The octree decoder 510 receives the obtained occupancy symbols from the arithmetic decoder 505, and decodes the received occupancy symbols into the quantized positions, using an octree decoding algorithm.

The inverse quantizer 515 receives the quantized positions from the octree decoder 510, and inverse quantizes the received quantized positions, using, e.g., a scaling algorithm and/or a shifting algorithm, to obtain reconstructed positions of the points in the input point cloud.

The LoD generator 520 receives the quantized positions from the octree decoder 510, and obtains the LoD of each of the points corresponding to the received quantized positions.

The inverse quantizer 525 receives the obtained quantized prediction residuals, and inverse quantizes the received quantized prediction residuals, using, e.g., a scaling algorithm and/or a shifting algorithm, to obtain reconstructed prediction residuals.

The inverse prediction module 530 receives the obtained reconstructed prediction residuals from the inverse quantizer 525, and receives the obtained LoD of each of the points from the LoD generator 520. The inverse prediction module 530 obtains reconstructed attributes respectively of the received reconstructed prediction residuals by applying a prediction algorithm to the received reconstructed prediction residuals in an order based on the received LoD of each of the points. The prediction algorithm may include any among various prediction algorithms such as, e.g., interpolation, weighted average calculation, a nearest neighbor algorithm and RDO. The reconstructed attributes are of the points in the input point cloud.

The methods and the apparatuses for point cloud attribute coding and decoding will now be described in detail. Such methods and apparatuses may be implemented in the G-PCC compressor 303 described above. The methods and the apparatuses may also be implemented in the G-PCC decompressor 310.

Figure 1B:
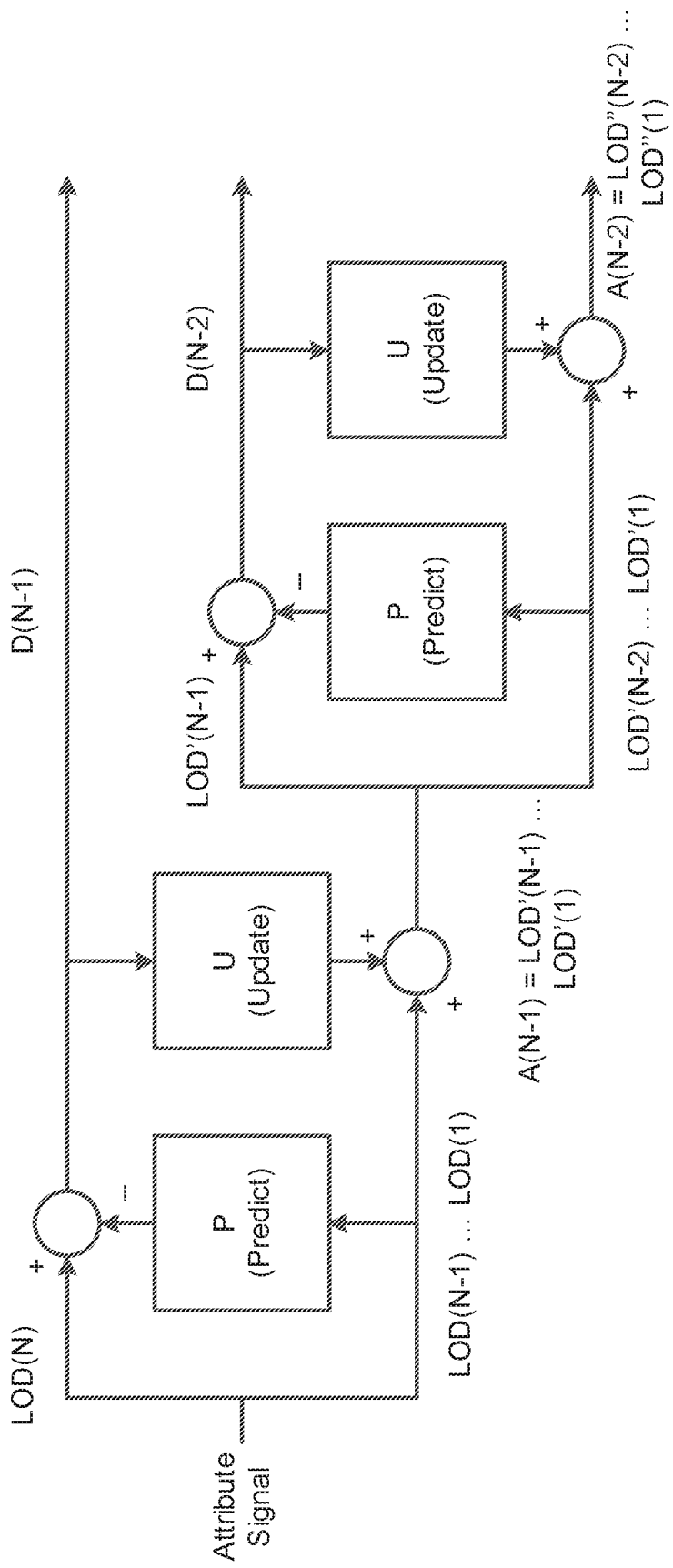
FIG. 1B is a diagram of an architecture for P/U-lifting in G-PCC.

Embodiments of the present disclosure, including methods and apparatuses, may pertain to the current G-PCC lifting design described with respect to FIGS. 1A-B. The embodiments may extend or modify current G-PCC lifting design to enable scalable coding of lifting coefficients. The methods of the embodiments can be applied to similar codecs designed for point clouds.

(1) G-PCC Anchor Scheme for Lifting Coefficient Coding (Single-Channel Signal)

The pseudo-code in TABLES 2 and 3, below, show the current lifting coefficient coding algorithm in G-PCC, which is based upon run-length coding. The anchor scheme is a non-embedded coding.

(A) Encoder

TABLE 2, below, shows pseudo code that may be executed by an encoder.

"qs" is the quantization step.

TABLE 2

```
-zero_cnt = 0
-Iterate over predictorIndex = 0 upto (predictorCount-1)
{
    delta = PCCQuantization(reflectance * quantWeight,qs) // quantized
    value
    detail = IntToUInt(delta) // quantization index
    reconstructedDelta = PCCInverseQuantization(delta,qs)
    reflectance = reconstructedDelta / quantWeight
    if (!detail)
        ++zero_cnt
```

TABLE 2-continued

```
    else {
        encodeZeroCnt(zero_cnt)
        encode(detail)
        zero_cnt = 0
    }
}
- encodeZeroCnt(zero_cnt)
```

(B) Decoder

TABLE 3, below, shows pseudo code that may be executed by a decoder.

TABLE 3

```
-zero_cnt = decoder.decodeZeroCnt( )
-Iterate over predictorIndex = 0 upto (predictorCount-1)
{
    detail = 0 // quantization-index
    if (zero_cnt > 0) {
        zero_cnt--
    } else {
        detail = decoder.decode( )
        zero_cnt = decoder.decodeZeroCnt( )
    }
    quantWeight = weights[predictorIndex]
    delta = UIntToInt(detail) // quantized value
    reconstructedDelta = PCCInverseQuantization(delta)
    reflectance = reconstructedDelta / quantWeight
}
```

(2) Scheme of Present Disclosure for Embedded Coefficient Coding (Single-Channel Signal)

Different from the anchor scheme described above, which does not generate an embedded bitstream, one or more embodiments of the present disclosure provide a scheme that iterates over multiple bit-planes from MSB (Most Significant Bit) down to LSB (Least Significant Bit) of each lifting transform coefficient. In each iteration, the scheme may proceed from the lowest (sparsest) to the highest (densest) LOD to process all points in a cloud. TABLES 4 and 5, below, show pseudocode in accordance with the one or more embodiments.

(A) Encoder

TABLE 4, below, shows pseudo code that may be executed by an encoder of the present disclosure.

The syntax elements "reflectance_embed" and "reflectance" are initialized to reflectance*quantWeight and zero, respectively at the beginning.

"NumLevel" is the most significant bit of the maximum values of reflectance*quantWeight and may be sent to a decoder of an embodiment at the beginning. The syntax element "reflectance" may be the lifting transform coefficient. The equation "reflectance*quantWeight" may correspond to a scaled version of the lifting transform coefficient. According to embodiments, the lifting transform coefficients may be obtained as a result of successive applications of Prediction and Update operation. In effect, prediction residuals of each Prediction step end up being lifting coefficients at that corresponding decomposition level.

"LastLevel" is the least significant bit of the syntax element "reflectance_embed" that corresponds to a final quantization level. The syntax element "reflectance_embed" may correspond to what is left to be further encoded for a lifting coefficient after "reconstructedDelta" is subtracted as a result of each bitplane coding iteration. Accordingly, "reflectance_embed" is successively reduced while "reflectance" is successively increased by the same amount, the magnitude of which is gradually decreased as one scans down the bitplanes.

TABLE 4

```
-Iterate over level = NumLevel − 1 down to LastLevel
{
        qs_level = 1 << level
        -Iterate over lodIndex = 0 up to lodCount−1
        {
                -Iterate over predictorIndex = 0 up to predictorCount−1
                {
                    detail = 0; delta = 0;
                    delta = Quantization(reflectance_embed, qs_level) // quantized value
(−1,0,1)
                    detail = (delta != 0); // quantization index (0 or 1)
                    reconstructedDelta = InverseQuantization(delta, qs_level)
                    reflectance_embed −= reconstructedDelta // successive refinement
                    reflectance += reconstructedDelta // successive refinement
                    if (!detail)
                         ++zero_cnt;
                    else
                    {
                         encodeZeroCnt(zero_cnt )
                         if (reflectance_signif[predictorIndex] == 0) {
                             // point with predictorIndex becomes "significant" at qs_level
                             encodeSign( delta > 0)
                             reflectance_sign[predictorIndex] = delta > 0 ? 1 : −1
                             reflectance_signif[predictorIndex] = 1
                         } else
                         {
                             // do nothing as end-of-zero in this case would mean
"refinement" at qs_level
                         }
                         zero_cnt = 0;
                    }
                    if (level == LastLevel)
                         reflectance /= quantWeight;
                } // predictorIndex loop
        } // lodIndex loop
    } // level loop
- encodeZeroCnt(zero_cnt );
```

(B) Decoder

TABLE 5, below, shows pseudo code that may be executed by an encoder of the present disclosure.

TABLE 5

```
-zero_cnt = decodeZeroCnt( )
-Iterate over level = NumLevel − 1 down to LastLevel
{
        qs_level = 1 << level
        -Iterate over lodIndex = 0 up to lodCount−1
        {
                -Iterate over predictorIndex = 0 up to predictorCount−1
                {
                    detail = delta = 0
                    if (zero_cnt > 0)
                         zero_cnt−−
                    else
                    {
                         if (reflectance_signif[predictorIndex] == 0)
                         {
                             // point with predictorIndex becomes "significant" at qs_level
                             delta = (decodeSign(0) == 1) ? 1 : −1 // quantized value (−1 or
1 )
                             reflectance_sign[predictorIndex] = delta
                             reflectance_signif[predictorIndex] = 1
                         }
                         else
                             delta = reflectance_sign[predictorIndex] //refinement bit (−1
or 1)
                         zero_cnt = decodeZeroCnt( ) // receive next zero_cnt
                    }
                    reconstructedDelta = InverseQuantization(delta, qs_level)
                    reflectance += reconstructedDelta // successive refinement
                    if (level == LastLevel)
                         reflectance /= quantWeight
                } // predictorIndex loop
        } // lodIndex loop
} // level
```

(3) G-PCC Anchor Scheme for Lifting Coefficient Coding (Color Signal)

The pseudo-code in TABLES 6 and 7, below, shows the current lifting coefficient coding algorithm for a three channel case in G-PCC, which is based upon run-length coding.

(A) Encoder

TABLE 6, below, shows pseudo code that may be executed by an encoder.

TABLE 6

```
zero_cnt = 0
for predictorIndex = 0 up to (predictorCount-1)
{
    for d=0 to 3 // color-channel number
    {
        delta = Quantization(color[d] * quantWeight,qs[d]) // quantized value
        detail = IntToUInt(delta) // quantization index
        reconstructedDelta = InverseQuantization(delta, qs[d])
        color[d] = reconstructedDelta / quantWeight
        values[d] = uint32_t(detail)
    } // end-of-for d
    if (!values[0] && !values[1] && !values[2])
        ++zero_cnt
    else
    {
        encodeZeroCnt(zero_cnt)
        encode(values[0], values[1], values[2])
        zero_cnt = 0
    }
} // end-of-for predictorIndex
encodeZeroCnt(zero_cnt)
```

(B) Decoder

TABLE 7, below, shows pseudo code that may be executed by a decoder.

TABLE 7

```
zero_cnt = decodeZeroCnt( )
for predictorIndex = 0 upto (predictorCount-1)
{
    if (zero_cnt > 0) {
        values[0] = values[1] = values[2] = 0;
        zero_cnt--;
    } else {
        decode(values)
        zero_cnt = decodeZeroCnt( )
    }
    for d=0 to 3 // color-channel number
    {
        delta = UIntToInt(values[d]);
        reconstructedDelta = InverseQuantization(delta, qs[d]);
        color[d] = reconstructedDelta / quantWeight;
    } //end-of-for d
}//end-of-for predictorIndex
```

(4) Scheme of Present Disclosure for Embedded Coefficient Coding (Color Signal)

The pseudo-code in TABLES 8 and 9, below, show a lifting coefficient coding algorithm of one or more embodiments of the present disclosure for a three channel case in G-PCC. Different from the anchor scheme described above, which does not generate an embedded bitstream, the one or more embodiments of the present disclosure provide a scheme that iterates over multiple bit-planes from MSB down to LSB of each lift transform coefficient. In each iteration, the scheme may proceed from the lowest (sparsest) to the highest (densest) LOD to process all points in a cloud.

(A) Encoder

TABLE 8, below, shows pseudo code that may be executed by an encoder of the present disclosure.

TABLE 8

```
- color_embed and color are initialized to color* quantWeight and zero,
respectively at the beginning
- NumLevel is the msb of the maximum values of color* quantWeight and sent
to the decoder at the beginning
-LastLevel is the lsb of color_embed that corresponds to the final quantization
level
for level = NumLevel - 1 down to LastLevel
{
    qs_level = 1 << level
    for lodIndex = 0 up to lodCount-1
    {
        for predictorIndex = 0 up to predictorCount-1
        {
            detail[3] = {0,0,0}
            delta[3] = {0,0,0}
            for d=0 to 3 // color-channel number
            {
                delta[d] = Quantization(color_embed[d], qs_level)
                detail[d] = (delta[d] != 0)
                reconstructedDelta = InverseQuantization(delta[d], qs_level)
                color_embed[d] -= reconstructedDelta
                color[d] += reconstructedDelta
            }//end-of-for d
            if (!detail[0] && !detail[1] && !detail[2])
            {
                ++zero_cnt;
            } else
            {
                encodeZeroCnt(zero_cnt);
                for d=0 to 3 // color-channel number
                {
                    if (colors_signif[predictorIndex][d] == 0 && detail[d]!=0 )
                    {
                        encodeRefine(detail[d], d) // actually a significance bit in this case
                        encodeSign(delta[d] > 0,d)
                        colors_sign[predictorIndex][d] = delta[d] > 0 ? 1 : -1
                        colors_signif[predictorIndex][d] = 1
```

TABLE 8-continued

```
                } else
                        encodeRefine(detail[d], d) //refinement bit
                } //end-of-for d
                zero_cnt = 0
            }
            if (level == LastLevel)
                color /= quantWeight;
        } // predictorIndex loop
    } // lodIndex loop
} // level loop
encodeZeroCnt(zero_cnt )
```

(B) Decoder

TABLE 9, below, shows pseudo code that may be executed by a decoder of the present disclosure.

TABLE 9

```
zero_cnt = decodeZeroCnt( )
for level = NumLevel - 1 down to LastLevel
{
    qs_level = 1 << level
    for lodIndex = 0 up to lodCount-1
    {
        for predictorIndex = 0 up to predictorCount-1
        {
            detail[3] ={0,0,0}
            delta[3] = {0,0,0}
            if (zero_cnt > 0) {
                zero_cnt--;
            }
            else
            {
                for d=0 to 3 // color-channel number
                {
                    if (colors_signif[predictorIndex][d] == 0)
                    {
                        sig = decodeRefine(d)
                        if (sig)
                        {
                            delta[d] = (decodeSign(d) == 1) ? 1 : -1
                            colors_sign[predictorIndex][d] = delta[d]
                            colors_signif[predictorIndex][d] = 1
                        }
                    }
                    else
                    {
                        ref = decodeRefine(d)
                        delta[d] = ref * colors_sign[predictorIndex][d]
                    }
                }//end-of-for d
                zero_cnt = decodeZeroCnt( )
            }
            for d=0 to 3 // color-channel number
            {
                reconstructedDelta = PCCInverseQuantization(delta[d],
qs_level)
                color[d] += reconstructedDelta
            }//end-of-for d
            if (level == LastLevel)
                color /= quantWeight
        } // predictorIndex loop
    } // lodIndex loop
} // level loop
```

According to one or more embodiments, instead of handling three color channels as a vector signal as described under heading (4) above (see, e.g., TABLES 8 and 9), the scheme described under heading (2) (see, e.g., TABLES 4 and 5) can be used for each channel, in which case, inter-channel similarities can be leveraged for context-modeling of entropy coding.

According to one or more embodiments, inter-LoD dependency can be leveraged for context-modeling of entropy coding. More specifically, as each point in a point cloud has its neighbors belonging to lower (i.e., sparser) levels which have already been coded for each level of bitplane coding, the lifting coefficients of lower LODs significance, sign, and refinement information can be utilized to use different context models for a current point's corresponding information. This is an analogous situation for typical 2D subband decomposition where one can expect the so-called 'parent-child' relationship among subbands.

Figure 6:
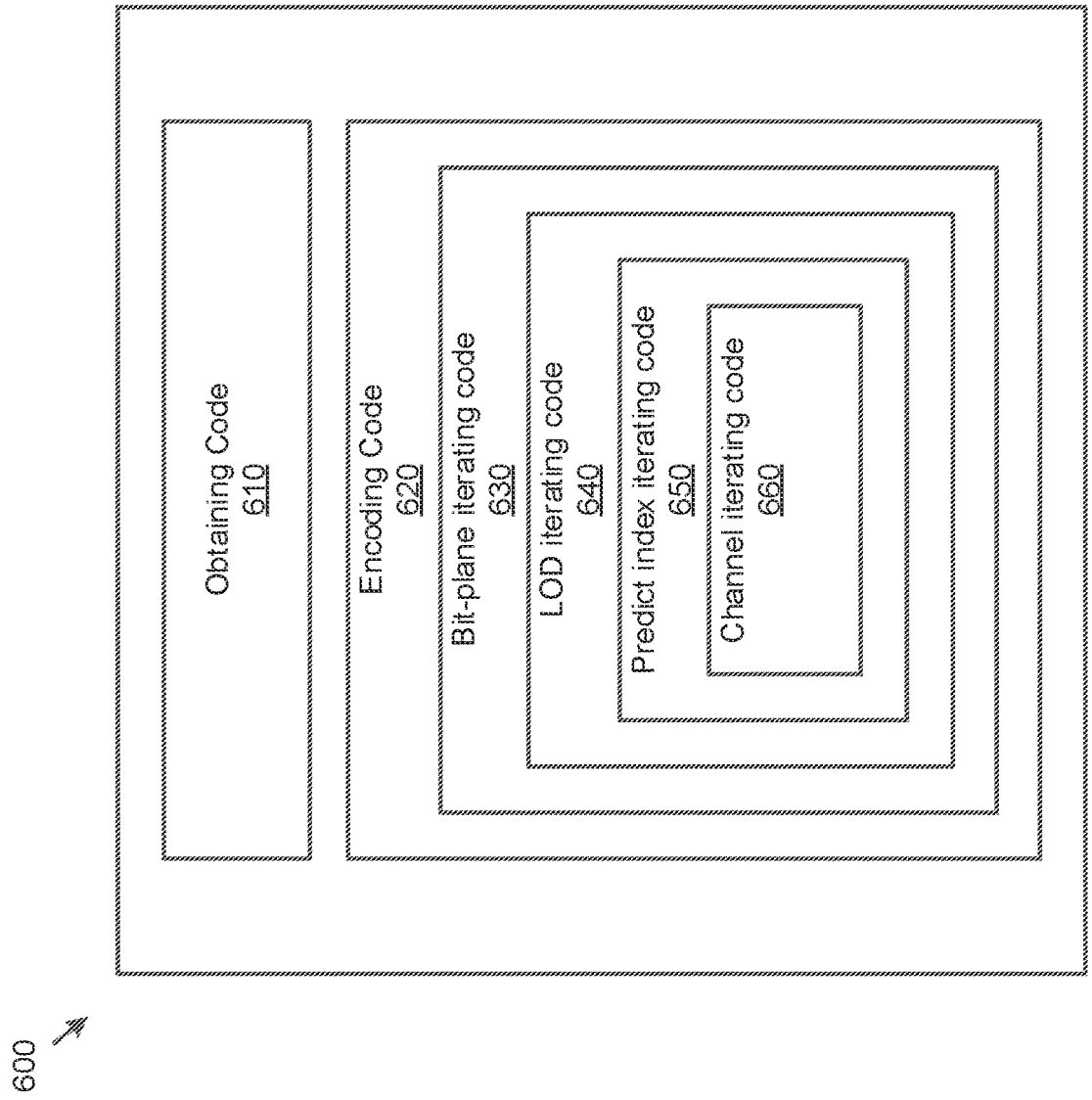
FIG. 6 is a block diagram of an apparatus for point cloud attribute encoding, according to embodiments.

FIG. 6 is a block diagram of an apparatus 600 for point cloud attribute coding, according to embodiments. The apparatus 600 may include at least one processor and memory, and may be configured as an encoder. The memory may store computer instructions configured to cause the at least one processor to perform one or more of the coding schemes described above. For example, the memory may store computer instructions to perform the schemes described with respect to headings (2) and (4) above.

Referring to FIG. 6, the memory of the apparatus 600 may include obtaining code 610 and encoding code 620. The obtaining code 610 may be configured to cause the at least one processor to obtain lift transform coefficients corresponding to attributes of a point cloud. The encoding code 620 may be configured to cause the at least one processor to encode the lift transform coefficients. The encoding code 620 may comprise a plurality of nested iterating codes to cause the lift transform coefficients to be encoded at different levels of encoding to generate an embedded bitstream and process all points in a point cloud. For example, the encoding code 620 may comprise one or more of bit-plane iterating code 630, LOD iterating code 640, and predictor index iterating code 650.

The bit-plane iterating code 630 may be configured to cause the at least one processor to iterate over bit-planes of the lift transform coefficients to process all points in the point cloud. For example, the bit-planes may be iterated over from a Most Significant Bit (MSB) to a Least Significant Bit (LSB) of the lift transform coefficients.

The LOD iterating code 640 may be configured to cause the at least one processor to iterate over LODs, corresponding to points in the point cloud, to process all points in the point cloud. For example, the LODs may be iterated over from a lowest (sparsest) LOD to a highest (densest) LOD of the LODs.

The predictor index iterating code 650 may be configured to cause the at least one processor to iterate over predictor indexes to process all points in the point cloud. For example, the predictor indexes may be iterated over from a lowest predictor index to a highest predictor index of the predictor indexes.

According to embodiments, and as illustrated in FIG. 6, the predictor index iterating code 650 may be nested in the LOD iterating code 640, and the LOD iterating code 640 may be nested in the bit-plane iterating code 630.

According to embodiments, the attributes, in which the lift transform coefficients correspond to, may include one or more channels. In a case where the attributes include multiple channels (e.g. 3 channels), the encoding code 620 may further comprise channel iterating code 660. The channel iterating code 660 may be configured cause the at least one processor to iterate over the channels to process all points in the point cloud. According to embodiments, and as illustrated in FIG. 6, the channel iterating code 660 may be nested in, for example, the predictor index iterating code 650. As an alternative to the channel iterating code 660, the encoding code 620 may be configured to cause the at least one processor to execute the bit-plane iterating code 630 (and the nested codes therein) a plurality of times such that, each of the plurality of times, lift transform coefficients corresponding to a respective channel of the plurality of channels are encoded.

Figure 7:
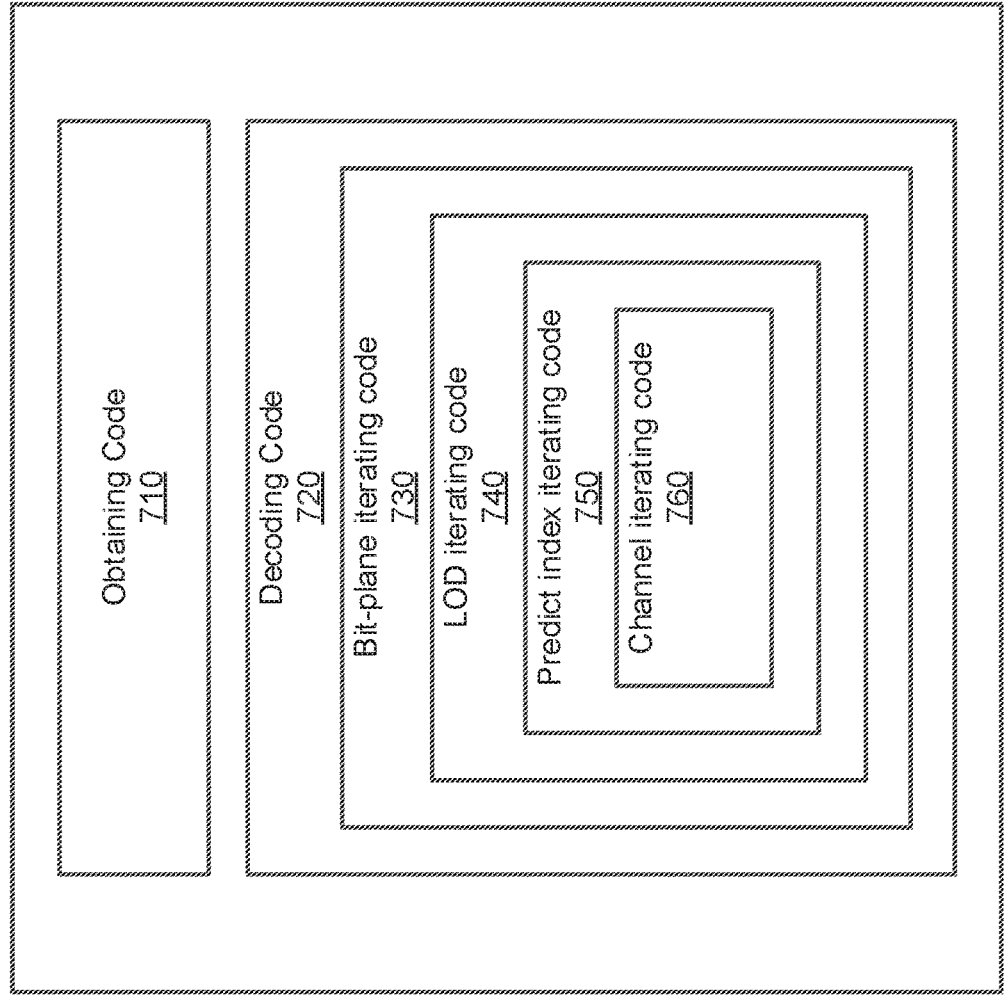
FIG. 7 is a block diagram of an apparatus for point cloud attribute decoding, according to embodiments.

FIG. 7 is a block diagram of an apparatus 700 for point cloud attribute decoding, according to embodiments. The apparatus 700 may include at least one processor and memory, and may be configured as a decoder. The memory may store computer instructions configured to cause the at least one processor to perform one or more of the decoding schemes described above. For example, the memory may store computer instructions to perform the schemes described with respect to headings (2) and (4) above.

Referring to FIG. 7, the apparatus 700 may include obtaining code 710 and decoding code 720. The decoding code 720 may be configured to cause the at least one processor to decode coded transform coefficients corresponding to attributes of the point cloud. The obtaining code 710 may be configured to cause the at least one processor to obtain (e.g. reconstruct) the attributes based on the decoded lift transform coefficients. The decoding code 720 may comprise a plurality of nested iterating codes to cause the lift transform coefficients to be decoded at different decoding levels. For example, the decoding code 720 may comprise one or more of bit-plane iterating code 730, LOD iterating code 740, and predictor index iterating code 750.

The bit-plane iterating code 730 may be configured to cause the at least one processor to iterate over bit-planes of the lift transform coefficients to decode the coded lift transform coefficients. For example, the bit-planes may be iterated over from a Most Significant Bit (MSB) to a Least Significant Bit (LSB) of the lift transform coefficients.

The LOD iterating code 740 may be configured to cause the at least one processor to iterate over LODs, corresponding to points in the point cloud, to decode the coded lift transform coefficients. For example, LODs may be iterated over from a lowest (sparsest) LOD to a highest (densest) LOD of the LODs.

The predictor index iterating code 750 may be configured to cause the at least one processor to iterate over predictor indexes to decode the coded lift transform coefficients. For example, the predictor indexes may be iterated over from a lowest predictor index to a highest predictor index of the predictor indexes.

According to embodiments, and as illustrated in FIG. 7, the predictor index iterating code 750 may be nested in the LOD iterating code 740, and the LOD iterating code 740 may be nested in the bit-plane iterating code 730.

According to embodiments, the attributes, of which the lifting transform coefficients correspond, may include one or more channels. In a case where the attributes include multiple channels (e.g. 3 channels), the decoding code 720 may further comprise channel iterating code 760. The channel iterating code 760 may be configured cause the at least one processor to iterate over the channels. According to embodiments, and as illustrated in FIG. 7, the channel iterating code 760 may be nested in, for example, the predictor index iterating code 750. As an alternative to the channel iterating code 760, the decoding code 720 may be configured to cause the at least one processor to execute the bit-plane iterating code 730 (and the nested codes therein) a plurality of times such that, each of the plurality of times, coded lift transform coefficients corresponding to a respective channel of the plurality of channels are decoded.

The techniques, described above, can be implemented in a video encoder and/or decoder adapted for point cloud compression/decompression. The encoder and/or decoder can be implemented in hardware, software, or any combination thereof, and the software, if any, can be stored in one or more non-transitory computer readable media. For example, each of the methods (or embodiments), encoders, and decoders may be implemented by processing circuitry (e.g., one or more processors or one or more integrated circuits). In one example, the one or more processors execute a program that is stored in a non-transitory computer-readable medium.

The techniques, described above, can be implemented as computer software using computer-readable instructions and physically stored in one or more computer-readable media. For example, FIG. 8 shows a computer system 900 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
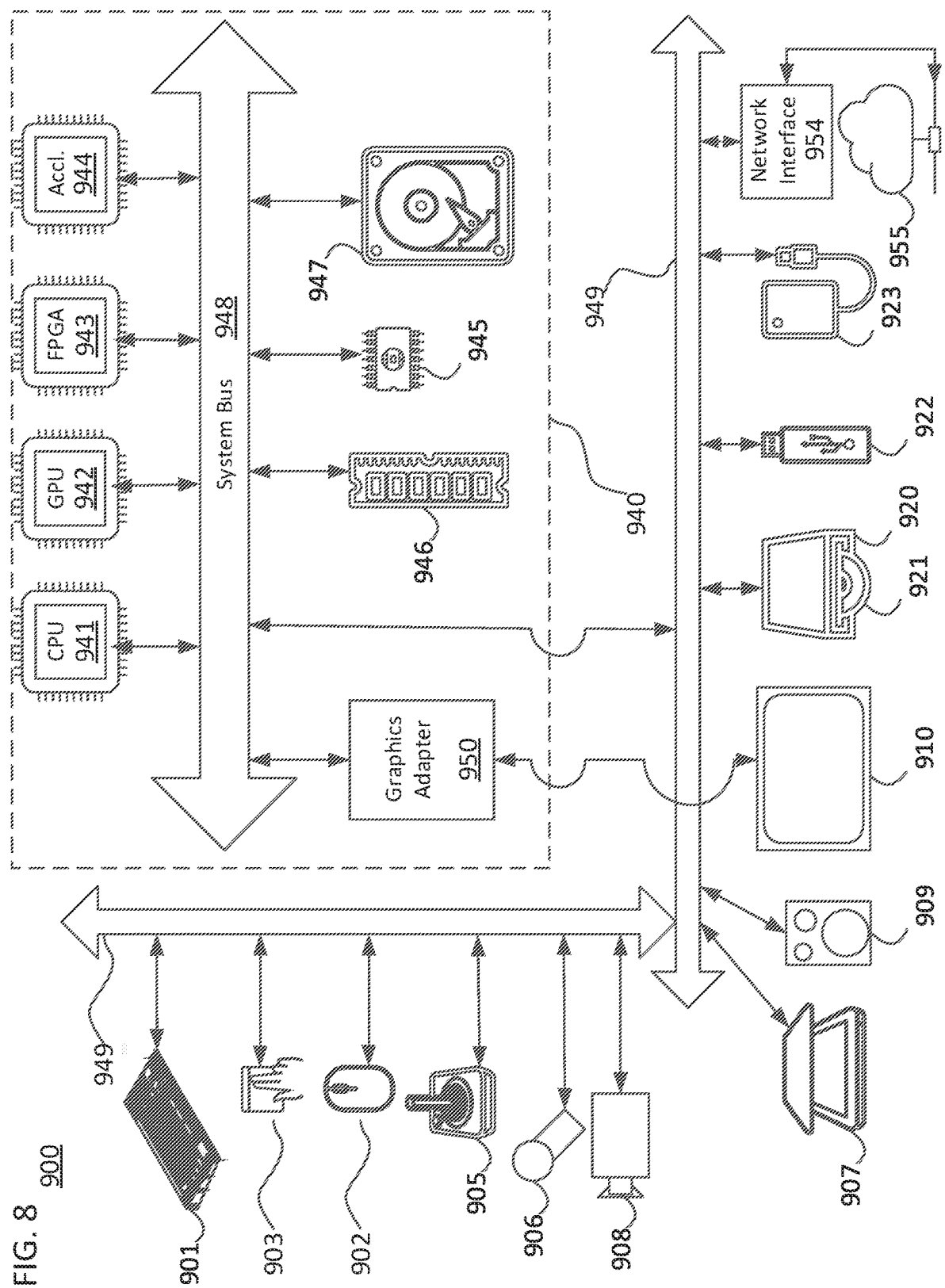
FIG. 8 is a diagram of a computer system suitable for implementing embodiments.

The components shown in FIG. 8 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of encoding video data corresponding to a point cloud by at least one processor, the method comprising:
    obtaining a plurality of transform coefficients corresponding to attributes of the point cloud; and
    encoding the plurality of transform coefficients to generate an embedded bitstream, the encoding comprising:
        iterating over a first plurality of bit-planes of the plurality of transform coefficients to process all points in the point cloud, wherein each of the first plurality of bit-planes comprises a plurality of bits;
        iterating over a second plurality of Levels-Of-Detail (LODs), corresponding to points in the point cloud, within each iteration of the first plurality of bit-planes to process all points in the point cloud; and
        performing quantization with respect to the plurality of transform coefficients in each iteration the second plurality of LODs within the each iteration of the first plurality of bit-planes,
    wherein the iterating over the first plurality of bit-planes comprises iterating over the first plurality of bit-planes from a Most Significant Bit (MSB) to a Least Significant Bit (LSB), the MSB being of a maximum value of scaled version of a lifting transform coefficient, and the LSB being of a first syntax element that indicates a remainder to be encoded for the lifting coefficient after subtraction of a result of a bitplane coding iteration.

2. The method of claim 1, wherein the encoding further comprises iterating over a third plurality of predictor indexes in each iteration the second plurality of LODs to process all points in the point cloud, and
    the performing the quantization comprises performing the quantization with respect to the plurality of transform coefficients in each iteration of the third plurality of predictor indexes that are in each iteration of the second plurality of LODs that are in each iteration of the first plurality of bit-planes.

3. The method of claim 1, wherein the iterating over the second plurality of LODs comprises iterating over the LODs from a lowest LOD to a highest LOD of the second plurality of LODs.

4. The method of claim 1, wherein the attributes are single channel attributes.

5. The method of claim 1, wherein the attributes have a plurality of channels.

6. The method of claim 5, wherein the encoding further comprises iterating over the plurality of channels in each iteration of the iterating over the first plurality of bit-planes to process all points in the point cloud.

7. The method of claim 5, wherein the encoding comprises iterating over each of the first plurality of bit-planes a plurality of times such that, each of the plurality of times, transform coefficients corresponding to a respective channel of the plurality of channels are coded.

8. The method of claim 1, wherein the plurality of transform coefficients are lift transform coefficients.

9. The method of claim 1, wherein the LSB corresponds to a final quantization level of the quantization.

10. The method of claim 1, further comprising sending a second syntax element to a decoder, the second syntax element indicating the MSB of the maximum value of scaled version of a lifting transform coefficient.

11. An apparatus for coding video data corresponding to a point cloud, the apparatus comprising:
    at least one memory configured to store computer program code; and
    at least one processor configured to access the at least one memory and operate according to the computer program code, the computer program code comprising:
        obtaining code configured to cause the at least one processor to obtain a plurality of transform coefficients corresponding to attributes of the point cloud; and
        encoding code configured to cause the at least one processor to encode the plurality of transform coefficients to generate an embedded bitstream, the encoding code comprising:
            first iterating code configured to cause the at least one processor to iterate over a first plurality of bit-planes of the plurality of transform coefficients to process all points in the point cloud, wherein each of the first plurality of bit-planes comprises a plurality of bits;
            second iterating code configured to cause the at least one processor to iterate over a second plurality of Levels-Of-Detail (LODs), corresponding to points in the point cloud, in each iteration of the first iterating code to process all points in the point cloud; and
            quantizing code configured to cause the at least one processor to perform quantization with respect to the plurality of transform coefficients in each iteration the second iterating code that are in each iteration of the first iterating code wherein the first iterating code is configured to cause the at least one processor over the first plurality of bit-planes from a Most Significant Bit (MSB) to a Least Significant Bit (LSB), the MSB being of a maximum value of scaled version of a lifting transform coefficient, and the LSB being of a first syntax element that indicates a remainder to be encoded for the lifting coefficient after subtraction of a result of a bitplane coding iteration.

12. The apparatus of claim 11, wherein the encoding code further comprises third iterating code configured to cause the at least one processor to iterate over a third plurality of predictor indexes in each iteration of the second iterating code to process all points in the point cloud, and
the quantizing code is configured to perform the quantization with respect to the plurality of transform coefficients in each iteration of the third iterating code that are in each iteration of the second iterating code that are in each iteration of the first iterating code.

13. The apparatus of claim 11, wherein the second iterating code is configured to cause the at least one processor to iterate over the second plurality of LODs from a lowest LOD to a highest LOD of the LODs.

14. The apparatus of claim 11, wherein the attributes are single channel attributes.

15. The apparatus of claim 11, wherein the attributes have a plurality of channels.

16. The apparatus of claim 15, wherein the encoding code further comprises third iterating code configured to cause the at least one processor to iterate over the plurality of channels in each iteration of the first iterating code to process all points in the point cloud.

17. The apparatus of claim 11, wherein the plurality of transform coefficients are lift transform coefficients.

18. A non-transitory computer-readable storage medium storing instructions that cause at least one processor to:
obtain a plurality of transform coefficients from video data corresponding to a point cloud, the transform coefficients corresponding to attributes of the point cloud; and
encode the plurality of transform coefficients to generate an embedded bitstream by:
    iterating over a first plurality of bit-planes of the plurality of transform coefficients to process all points in the point cloud;
    iterating over a second plurality of Levels-Of-Detail (LODs), corresponding to points in the point cloud, in each iteration the first plurality of bit-planes to process all points in the point cloud; and
    performing quantization with respect to the plurality of transform coefficients in each iteration the second plurality of LODs that are in each iteration of the first plurality of bit-planes,
wherein the iterating over the first plurality of bit-planes comprises iterating over the first plurality of bit-planes from a Most Significant Bit (MSB) to a Least Significant Bit (LSB), the MSB being of a maximum value of scaled version of a lifting transform coefficient, and the LSB being of a first syntax element that indicates a remainder to be encoded for the lifting coefficient after subtraction of a result of a bitplane coding iteration.

* * * * *